United States Patent
Goto

(10) Patent No.: US 6,408,121 B1
(45) Date of Patent: Jun. 18, 2002

(54) OPTICAL COMMUNICATION MODULE

(75) Inventor: Akio Goto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/513,927

(22) Filed: Feb. 28, 2000

(30) Foreign Application Priority Data

Feb. 26, 1999 (JP) .......................................... 11-049495

(51) Int. Cl.[7] ................................................ G02B 6/10
(52) U.S. Cl. ........................... 385/129; 385/89; 385/32; 385/88; 385/42
(58) Field of Search ............................. 385/89, 32, 31, 385/88, 129, 18, 92, 40, 41, 42

(56) References Cited

U.S. PATENT DOCUMENTS 5,799,120 A * 8/1998 Kurata et al. .................. 385/45
6,061,481 A * 5/2000 Heidrich et al. ............... 385/14

FOREIGN PATENT DOCUMENTS

| JP | 61-242069 | 10/1986 | ............ H01L/27/15 |
| JP | 63-85607  | 4/1988  | ............ G02B/6/28 |
| JP | 6-18728   | 1/1994  | ............ G02B/6/12 |
| JP | 6-34833   | 2/1994  | ............ G02B/6/12 |
| JP | 7-168038  | 7/1995  | ............ G02B/6/122 |
| JP | 8-190026  | 7/1996  |  |
| JP | 9-101429  | 4/1997  | ............ G02B/6/293 |
| JP | 10-307221 | 11/1998 |  |

* cited by examiner

Primary Examiner—Cassandra Spyrou
Assistant Examiner—Christopher S. Maxie
(74) Attorney, Agent, or Firm—McGinn & Gibb, PLLC

(57) ABSTRACT

An optical communication module comprises an optical communication substrate provided with planar divided waveguides which are optically coupled with a light-receiving device for an optical communication, a light-emitting device for the optical communication, and another light-receiving device for monitoring a outputted light-power, wherein the planar divided waveguides have such a configuration that X-shaped branch waveguides are divided by a blind slit at a crossing thereof so that the crossing is removed, and an optical filter inserted into the blind slit. In the aforementioned optical communication module, the light-receiving device for monitoring the outputted light power can be allocated remote from as well as near the light-emitting device for the optical communication, hence a degree of freedom in mounting parts can be heightened.

11 Claims, 4 Drawing Sheets

OPTICAL COMMUNICATION MODULE

FIELD OF THE INVENTION

This invention relates to an optical communication module used for transmitting and receiving optical signals or transmitting an optical signal.

BACKGROUND OF THE INVENTION

In general, an optical communication module used for transmitting and receiving optical signals is provided with semiconductor optical devices of three kinds, that is to say, a semiconductor laser diode serving as a light-emitting device for an optical communication, a semiconductor photodiode serving as a light-receiving device for receiving an optical signal transmitted through an optical transmission line, and another semiconductor photodiode serving as a light-receiving device for monitoring a light power outputted from the light-emitting device.

Hitherto, the light-receiving device of a waveguide PD(photodiode) or a PIN-PD has been adopted as the light-receiving device in the optical communication module of the aforementioned kind.

A fabrication of the optical communication module is performed as follows. In case that the waveguide PD is adopted, the light-receiving device is mounted on the waveguide substrate. In case that the PIN-PD is adopted, the light-receiving device is mounted on a carrier other than the waveguide substrate, and thereafter accommodated in a module package.

However, in the conventional optical communication module, since the light-receiving device for monitoring the outputted light power receives a backward light from the light-emitting device for the optical communication, it is necessary to allocate the light-receiving device for monitoring the outputted light power near the light-emitting device for the optical communication.

As a result, positions on which the light-receiving device for monitoring the outputted light power etc. are mounted are restricted, and a degree of freedom in mounting parts is lowered.

Although "an optical transmitting and receiving module" and "a semiconductor optical coupling device and a method for fabricating the same" are respectively disclosed in Japanese patent application, laid-open, Nos. 8-190026 and 10-307221 as preceding technologies, the aforementioned problem is not solved therein.

SUMMARY OF THE INVENTION

Accordingly, it is an object of the invention to provide an optical communication module in which a light-receiving device for monitoring an outputted light power can be allocated remote from as well as near a light-emitting device for an optical communication and a degree of freedom in mounting parts can be heightened by adopting a planar divided waveguides.

It is a further object of the invention to provide an optical communication module in which a light-receiving device for monitoring an outputted light power can be allocated remote from as well as near a light-emitting device for an optical communication and a degree of freedom in mounting parts is heightened by adopting planar V-shaped waveguides.

It is a still further object of the invention to provide an optical communication module for transmitting an optical signal in which a light-receiving device for monitoring an outputted light power can allocate remote from as well as near a light-emitting device for an optical communication and degree of freedom in mounting parts can be heightened by adopting a directional coupler.

According to the first feature of the invention, an optical communication module comprises:

an optical communication substrate provide with planar divided waveguides which are optically coupled with a light-receiving device for an optical communication, a light-emitting device for the optical communication, another light-receiving device for monitoring a light power outputted from the light-emitting device and an optical fiber for the optical communication, wherein the planar divided waveguides have such a configuration that X-shaped branch waveguides are divided by a blind slit at a crossing thereof so that said crossing is removed, and an optical filter inserted into the blind slit.

Accordingly, an optical signal outputted from the light-emitting device for the optical communication passes through the planar divided waveguides and the optical filter, and reaches the light-receiving device for monitoring the outputted light power.

The optical filter may be inserted into the blind slit so as to be interchangeable.

Accordingly, if the optical filter is interchanged with another optical filter having a different optical transmission coefficient, a monitoring current corresponding to the different optical transmission coefficient flows into the light-receiving device for monitoring the outputted light power.

According to the second feature of the invention, an optical communication module comprises:

an optical communication substrate provided with planar V-shaped waveguides to be optically coupled with a light-receiving device for an optical communication, a light-emitting device for the optical communication, and another light-receiving device for monitoring a light power outputted from the light-emitting device, and an optical filter which is mounted on a side surface of the optical communication substrate at a side end thereof and optically coupled with a joining portion of the V-shaped planar waveguides, wherein the two light receiving devices are respectively allocated so as to be opposed to the optical filter, and end faces of waveguides composing the V-shaped planar waveguides opposite to the joining portion are respectively and optically coupled with the light-emitting device and an optical fiber for the optical communication.

The light-receiving devices for the optical communication and for monitoring the outputted light power may be allocates at a predetermined distance.

Accordingly, an angle formed by the planar V-shape waveguides increases.

Moreover, both the light-receiving devices may be allocated so as to be adjacent to each other.

In this case, the angle formed by the planar V-shaped waveguides is reduced.

According to the third feature of the invention, an optical communication module comprises:

an optical communication substrate provided with a light-emitting device for an optical communication and a pair of waveguides communicated with a directional coupler which is to be optically coupled with a light-receiving device for monitoring a light power emitted from the light-emitting device, and an optical filter which is mounted on a side surface of the optical communication substrate at a side end thereof and optically coupled with leading ends of the directional coupler at a light-receiving surface thereof, wherein the light-receiving device is allocated so as to be opposed to the optical filter, and end faces of the pair of the waveguides opposite to the directional coupler are respectively and optically coupled with the light-emitting device and an optical fiber for the optical communication.

BRIEF DESCRIPTION OF THE DRAWINGS

The invention will be explained in more detail in conjunction with the appended drawings, wherein.

DESCRIPTION OF THE PREFERRED EMBODIMENTS

Hereafter, preferred embodiments of the invention will be explained referring to the appended drawings.

Figure 1:
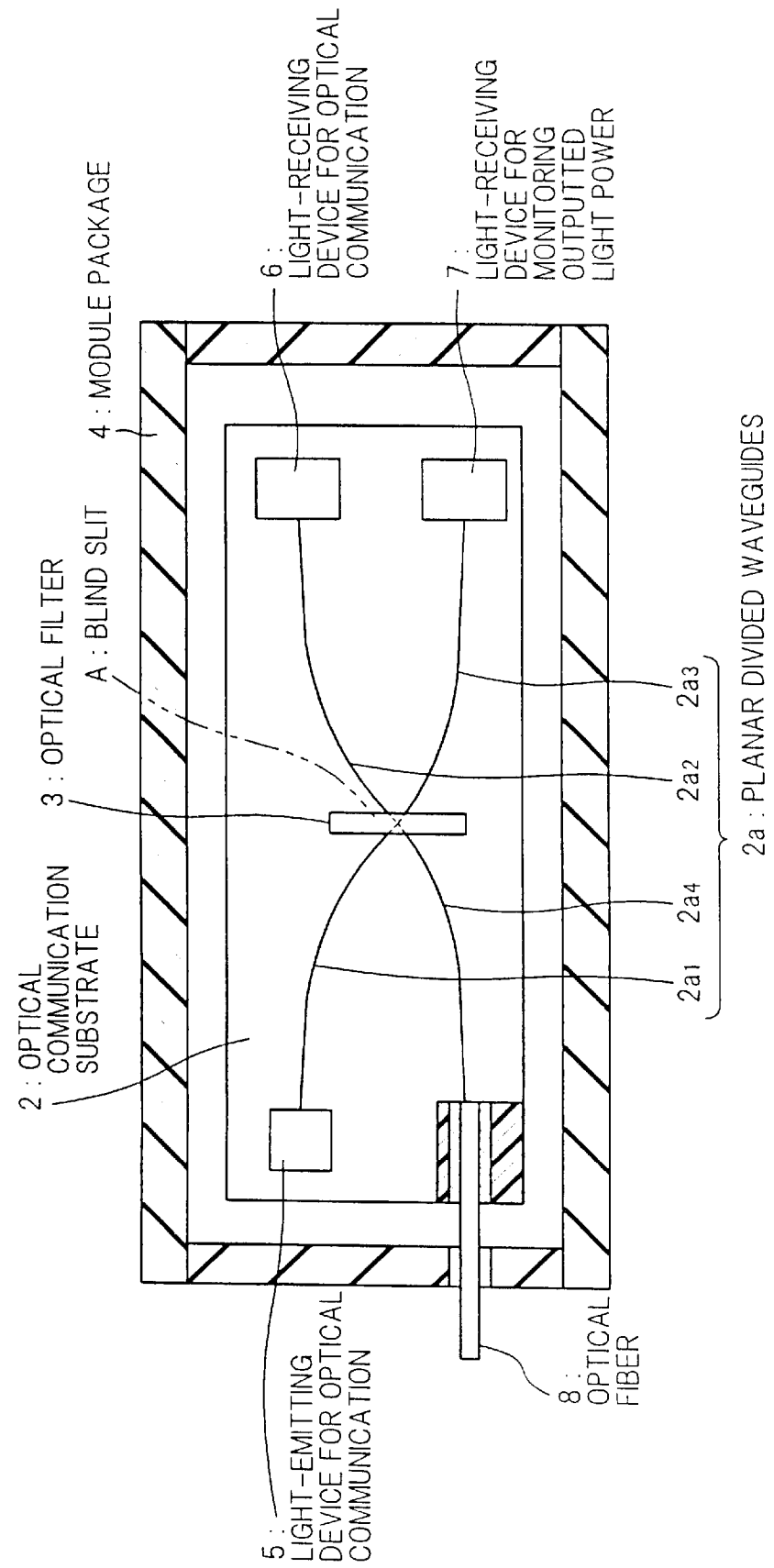
FIG. 1 is a cross-sectional view for showing an optical communication module according to the first preferred embodiment of the invention.

FIG. 1 is a cross-sectional view for showing an optical communication module according to the first preferred embodiment of the invention.

In FIG.1, the optical communication module denoted by a reference numeral 1 is provided with an optical communication substrate 2 and an optical filter 3.

The optical communication substrate 2 is formed of a waveguide substrate comprising planar divided waveguides 2a, which has such a configuration that X-shaped branch waveguides are divided by a blind slit A at a crossing thereof so that the crossing is removed as shown in FIG.1. The optical communication substrate is fixed to a module package 4. A light-emitting device for an optical communication 5 formed of a semiconductor laser diode, a light-receiving device for the optical communication 6 formed of a semiconductor photodiode, and a light-receiving device for monitoring the outputted light power 7 formed of a semiconductor photodiode are respectively mounted on the optical communication substrate 2.

The divided waveguides 2a are composed of four waveguides 2a1 to 2a4. In the aforementioned waveguides, end faces of the waveguides 2a1 to 2a3, each being opposite to the blind slit A, are optically coupled with the light-emitting device for the optical communication 5, the light-receiving device for the optical communication 6, and the light-receiving device for monitoring the outputted light power 7. Moreover, on the optical communication substrate 2, an end face of the waveguides 2a4 opposite to the blind slit A is optically coupled with an optical fiber 8 serving as an optical transmission line.

An optical filter 3 is formed of a dielectric multi-layered filter, and inserted into the blind slit A so as to be interchangeable. If the optical filter 3 is interchanged with another optical filter (not shown) having a different optical transmission coefficient, a monitoring current corresponding to the different transmission coefficient flows into the light-receiving device for monitoring outputted light power 7.

In the optical communication module having the aforementioned structure, when an optical signal emitted from the light-emitting device for the optical communication 5 propagates through the waveguide 2a1 and reaches the optical filter 3, a great part of the optical signal is reflected by the optical filter 3, reaches the optical fiber 8 via the waveguide 2a4, and propagates to the outside of the module package 4 via the optical fiber 8.

In this case, the remainder of the optical signal reaching the optical filter 3 transmits through the optical filter 3 and the waveguide 2a3, and reaches the light-receiving device for monitoring the outputted light power 7.

On the other hand, when an optical signal is supplied from the outside of the module package 4 through the optical fiber 8, the optical signal reaches the light-receiving device for the optical communication 6 via the waveguide 2a4, the optical filter 3 and the waveguide 2a2.

Accordingly, in this embodiment, since the light-receiving device for monitoring the outputted light power 7 does not receive the backward light from the light-emitting device for the optical communication 5 dissimilarly to the conventional optical communication module, the light-receiving device for monitoring the outputted light power 7 can be mounted at a position remote from as well as near the light-emitting device for the optical communication 5.

Next, the second preferred embodiment of the invention will be explained referring to FIG. 2.

Figure 2:
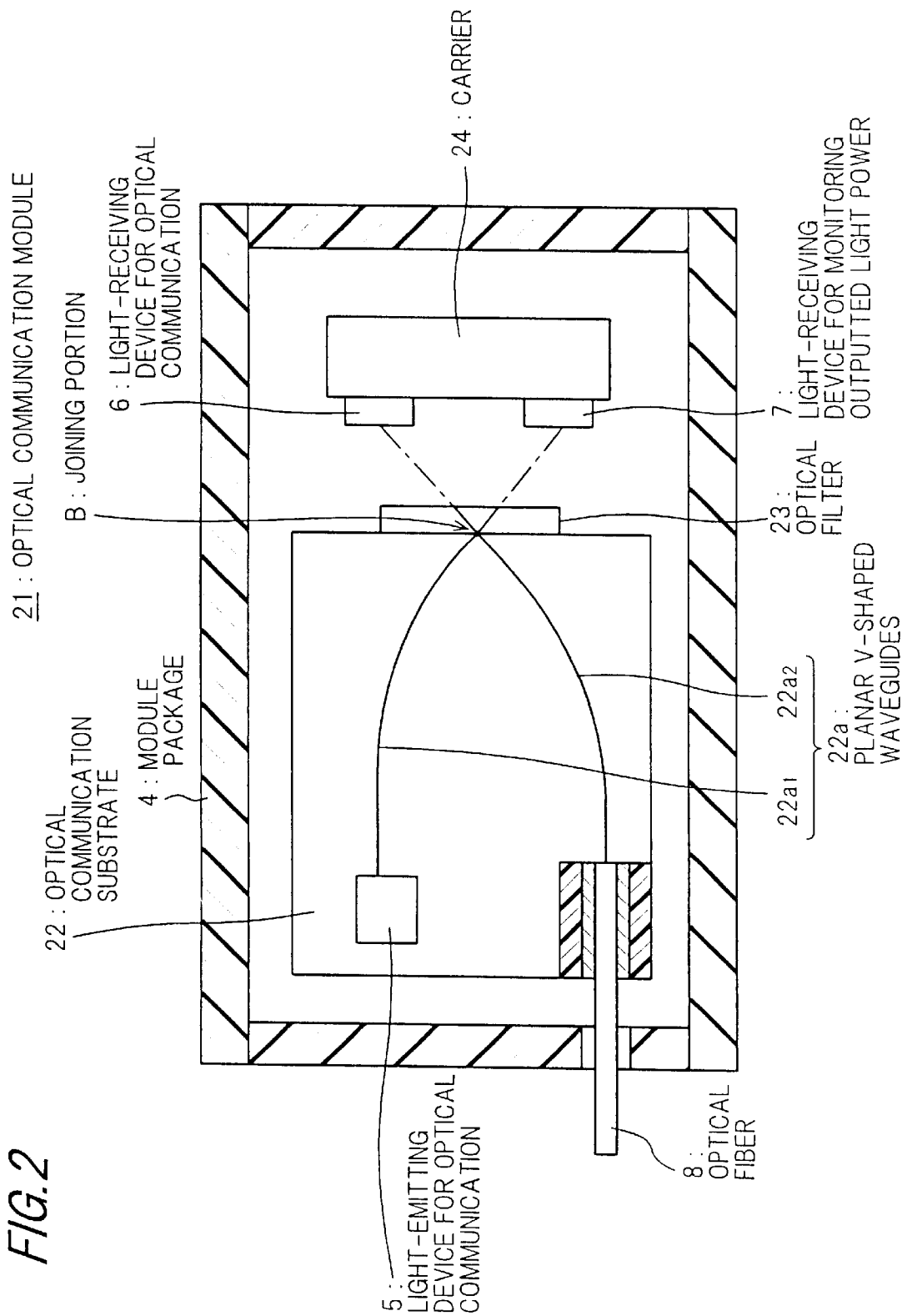
FIG. 2 is a cross-sectional view for showing an optical communication module according to the second preferred embodiment of the invention.

FIG. 2 is a cross-sectional view for showing the optical communication module according to the second preferred embodiment of the invention. Through FIGS. 1 to 2, structural elements having the same functions are denoted by the same reference numerals, and detailed explanations thereon will be omitted. An optical communication module denoted by 21 is provided with an optical communication substrate 22, an optical filter 23 and a carrier 24.

The optical communication substrate 22 is formed of a waveguide substrate, which is provided with planar V-shaped waveguides 22a and fixed to a module package 4. A light-emitting device for an optical communication 5 is mounted on the optical communication substrate 22.

The waveguides 22a are formed of two waveguides 22a1, 22a2, and a joining portion B of the waveguides 22a1, 22a2 is allocated on the light-receiving surface of the optical filter 23. An end face of the waveguide 22a1 opposite to the joining portion B is optically coupled with a light-emitting device for an optical communication 5. On the optical communication substrate 22, an end face of the waveguide 22a2 opposite to the joining portion B is optically coupled with an optical fiber 8 serving as an optical transmission line.

The optical filter 23 is formed of a dielectric multi-layered filter etc., fitted to a side surface of the optical communication substrate 22 so as to be interchangeable, and optically coupled with the waveguides 22a. Accordingly, if the optical filter 23 is interchanged with another optical filter (not shown) having a different optical transmission coefficient, a monitoring current corresponding to the different optical transmission coefficient flows into the light receiving device for monitoring an outputted light power 7.

The carrier 24 is allocated near a side end of the optical communication substrate 22 and accommodated in a module package 4. The light-receiving device for the optical communication 6 and the light receiving device for monitoring the outputted light power 7 are mounted at a predetermined interval on a side surface of the carrier 24 which is opposed to the optical filter 23. According to the aforementioned configuration, an angle formed by light beams incident on the light-receiving device for monitoring the outputted light power 7 and the light-receiving device for the optical communication 6 becomes large. In this case, an angle formed by the waveguides 22a1, 22a2 is determined in accordance with a distance between both the light-receiving devices 6, 7.

Figure 3:
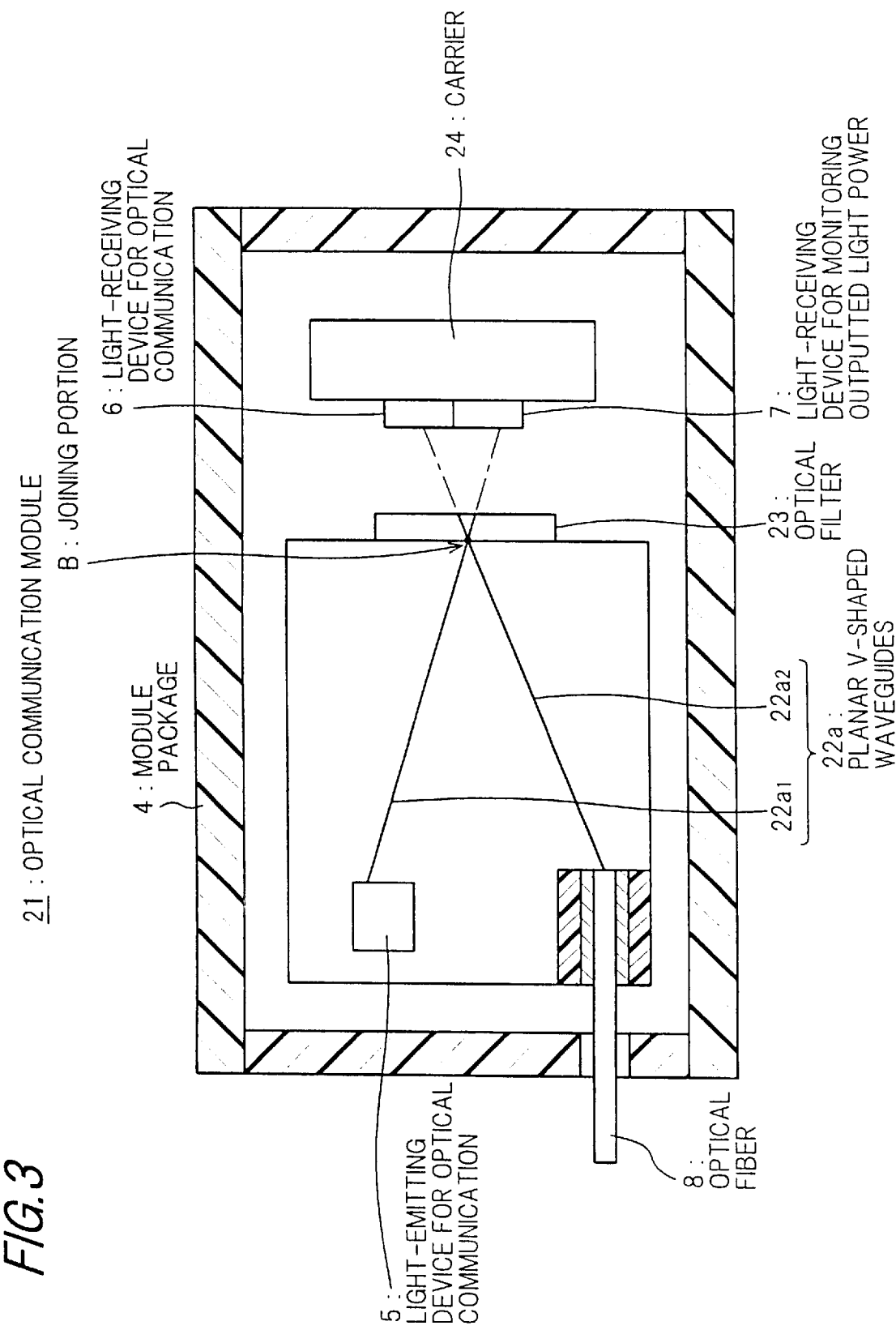
FIG. 3 is a cross-sectional view for showing an optical communication module according to the third preferred embodiment of the invention.

Although an explanation is given for case that the light-receiving device for the optical communication 6 and the light-receiving device for monitoring the outputted light power 7 are mounted at a predetermined interval in the above description, the application of the invention is never restricted to the aforementioned case, and the light-receiving device for the optical communication 6 and the light-receiving device for monitoring the outputted light power 7 may be adjacent to each other as shown in FIG. 3 which explains the third preferred embodiment of the invention. In the aforementioned configuration, an angle formed by both the waveguides 22a1, 22a2 is made small, and both the light-receiving devices 6, 7 can be unified.

In each of the second and third preferred embodiments of the invention mentioned in the above, when the optical signal emitted from the light-emitting device 5 reaches the optical filter 23 via the waveguide 22a1, a great part of the optical signal is reflected by the optical filter 23, reaches the optical fiber 8 via the waveguide 22a2, and propagates to the outside of the module package 4 through the optical fiber 8.

In this case, the remainder of the optical signal transmits through the optical filter 23, propagates through a space, and reaches the light-receiving device for monitoring the outputted light power 7.

On the other hand, when the optical signal from the outside of the module package 4 is supplied through the optical fiber 8, the optical signal propagates through the waveguide 22a2 via the optical fiber 8, and reaches the light-receiving device for the optical communication 6 via the optical filter 23 and the space.

Accordingly, in each of the aforementioned embodiments (the second and third preferred embodiments), since the light-receiving device for monitoring the outputted light power 7 does not receive the backward light emitted from the light-emitting device for the optical communication 5, the light-receiving device for monitoring the outputted light power 7 can be mounted at a position remote from as well as near the light-emitting device for the optical communication 5 similarly to the first preferred embodiment. Moreover, in the aforementioned embodiments, since the PIN-PDs can be used as both the light-receiving devices 6, 7. The cost prices of the products can be reduced.

Moreover, in the aforementioned embodiments, since both the light-receiving devices 6, 7 are not mounted on the optical communication substrate 22 but mounted on the carrier 24, accuracies of mountings can be relaxed.

Stillmore, in each of the second and third preferred embodiments, since a single optical device (the light-emitting device for the optical communication 5) is mounted on the optical communication substrate 22, solder of only one kind is needed at the time of soldering.

Figure 4:
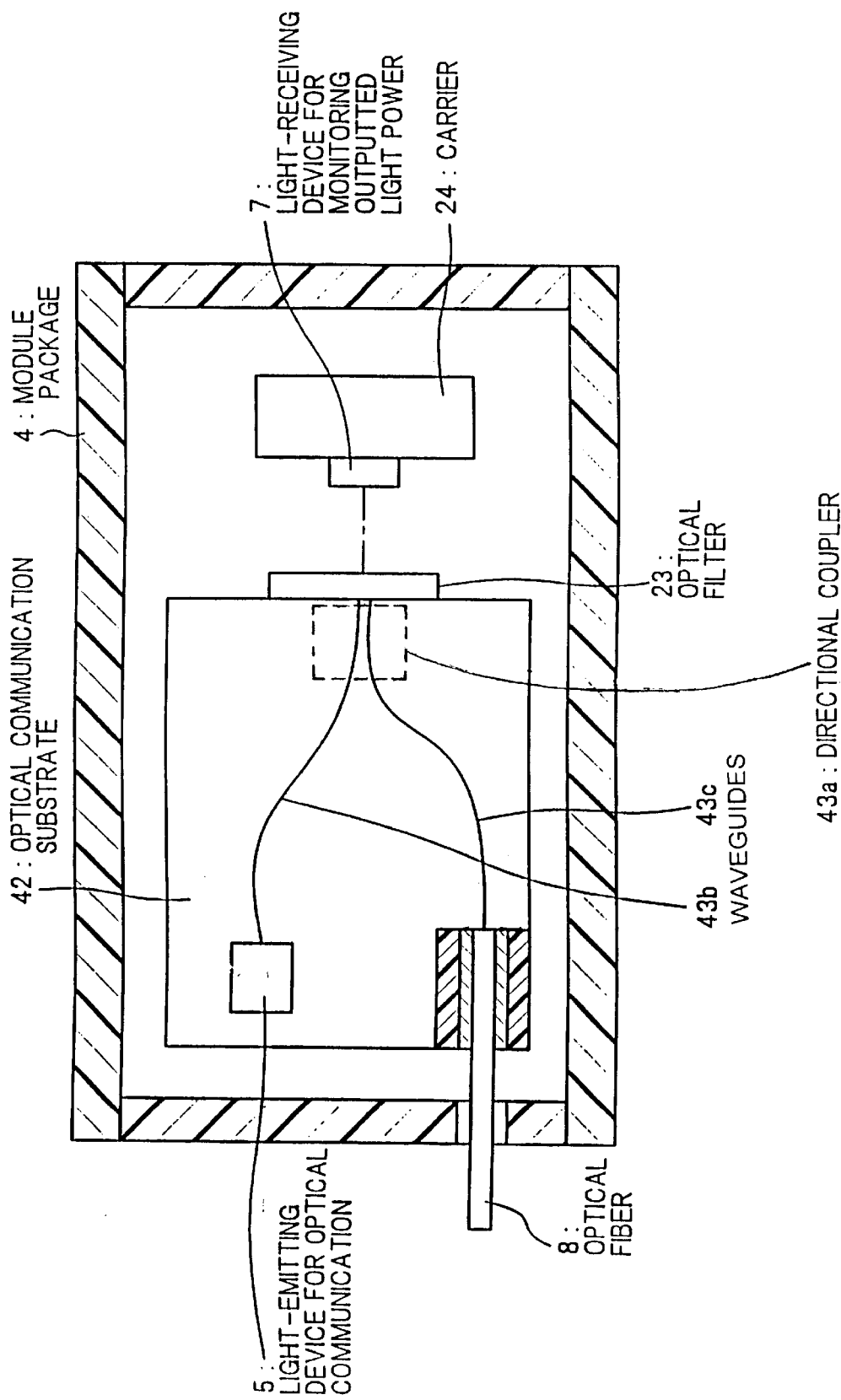
FIG. 4 is a cross-sectional view for showing an optical communication module according to the fourth preferred embodiment of the invention.

Although the optical transmitting and receiving modules are explained in the first to third preferred embodiments, the application of the invention is never restricted to the optical transmitting and receiving module, and a similar effect can be obtained in case that the invention is applied to the optical transmitting module, which is shown in FIG. 4 as the fourth preferred embodiment.

FIG. 4 is a cross-sectional view for showing the fourth preferred embodiment of the invention. In FIGS. 2, 3 and 4, the structural elements having the same functions are denoted by the same reference numerals, and the detailed explanation will be omitted.

In FIG. 4, the optical communication module denoted by a reference numeral 41 is provided with an optical communication substrate 42, an optical filter 23, and a carrier 24.

The optical communication substrate 42 is formed of a waveguide substrate which is provided with waveguides 43 having a directional coupler 43a and fixed to a module package 4.

A light-emitting device for an optical communication 5 is mounted on the optical communication substrate 42.

A length of the directional coupler 43a in the direction of a wave-guiding is selected so as to be a half of the completer coupling length thereof. Leading ends of the directional coupler 43a are positioned on a light-receiving surface of the optical filter 23. End faces of the directional coupler 43a opposite to the optical filter 23 are connected with the optical waveguides 43b, 43c, which are respectively and optically coupled with the light-emitting device for the optical communication 5 and the optical fiber 8.

The optical filter 23 is formed of a dielectric multi-layered filter, fitted to a side surface of the optical communication substrate 22 so as to be interchangeable, and optically coupled with the leading ends of the directional coupler 43a. When the optical filter 23 is interchanged with another optical filter (not shown) having a different optical transmission coefficient, a monitoring current corresponding to the different optical transmission coefficient flows into the light-receiving device for monitoring the outputted light power 7.

The carrier 24 is allocated near a side end of the optical communication substrate 22, and accommodated in a module package 4. The light-receiving device for monitoring the outputted light power 7 is mounted on a surface of the carrier 24 opposed to the optical filter 23.

In the optical communication module thus fabricated, when the light emitted from the light-emitting device for the optical communication 5 reaches the optical filter 23 via the waveguide 43b and the directional coupler 43a, a great part of the light is reflected by the optical filter 23, reaches an optical fiber 8 via the directional coupler 43a and the waveguide 43c, and propagates through the optical fiber 8 to the outside of the module package 4.

In this case, the remainder of the light incident on the optical filter 23 transmits therethrough, passes through a space, and reaches the light-receiving device for monitoring the outputted light power 7 as a monitoring light.

As mentioned in the above, in this embodiment, since the light-receiving device for monitoring the outputted light power 7 does not receive the backward light from the light-emitting device for the optical communication 5 dissimilarly to the conventional optical communication module, the light-receiving device for monitoring the outputted light power 7 can be mounted at a position remote from as well as near the light-emitting device for the optical communication 5 similarly to the first preferred embodiment.

As mentioned in the above, since the optical communication module according to the invention comprises an optical communication substrate provided with planar divided waveguides which are optically coupled with the light-receiving device for an optical communication, a light-emitting device for the optical communication, another light-receiving device for monitoring a light power outputted from the light-emitting device and an optical fiber for the optical communication, wherein the planar divided waveguides have such a configuration that X-shaped branch waveguides are divided by a blind slit at a crossing thereof so that the crossing is removed, and an optical filter inserted into the blind slit, an optical signal emitted from the light-emitting device passes through the planar divided waveguides and the optical filter, and reaches the light-receiving device for monitoring the light outputted from the light-emitting device for the optical communication.

Accordingly, in the optical communication module according to the invention, since the light-receiving device for monitoring the outputted light power does not receive a backward light from the light-emitting device for the optical communication dissimilarly to the conventional optical communication module, the light-receiving device for monitoring the outputted light power can be allocated at a position remote from as well as near the light-emitting device for the optical communication, and as a result, a degree of freedom in mounting parts can be heightened.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical communication module used for transmitting and receiving optical signals, comprising:
    an optical communication substrate with divided waveguides configured as an X-shape in a plan view, each divided waveguide being divided by a blind slit at a crossing of the X-shape;
    an optical filter, inserted into the blind slit, that reflects a greater part of a transmitted light signal;
    a light-emitting device that produces the transmitted light signal and is optically coupled to the optical filter, where the greater part of the transmitted light signal is transmitted to an optical fiber by a divided waveguide and a lesser part of the transmitted light signal is transmitted to a light-receiving device for monitoring outputted light power by another divided waveguide; and
    a light-receiving device for receiving optical signals from the optical fiber by a divided waveguide.

2. A method of transmitting and receiving optical signals, comprising;
    dividing waveguides that intersect in a plan view by a perpendicular plane including the intersection;
    inserting an optical filter in the perpendicular plane that reflects a greater part of a transmitted light signal;
    optically coupling a light-emitting device that produces the transmitted light signal to the optical filter, where the greater part of the transmitted light signal is reflected and transmitted to an optical fiber by a divided waveguide and a lesser part of the transmitted light signal is transmitted to a light-receiving device for monitoring outputted light power by another divided waveguide; and
    receiving optical signals from the optical fiber at a light-receiving device for receiving optical signals by a divided waveguide.

3. A method of transmitting and receiving optical signals as claimed in claim 2, further comprising:
    selecting the optical filter with a predetermined optical transmission coefficient that determines an intensity of the transmitted light signal received by the light-receiving device for monitoring outputted light power.

4. An optical communication module used for transmitting and receiving optical signals, comprising:
    an optical communication substrate with a pair of waveguides, each of the pair of waveguides having a first end face opposite a joining portion, located at a vertex of a V-shape in a plan view, on a light-receiving surface of an optical filter that is mounted on a side surface of the optical communication substrate;
    a light-emitting device used for transmitting optical signals to an optical fiber by the pair of planar waveguides and to a light-receiving device for monitoring outputted light power by a waveguide to the joining portion on the light-receiving surface of the optical filter and then to the light-receiving device for monitoring outputted light power that is located at a distance from and opposite to the optical filter; and
    a light-receiving device for receiving optical signals, located at a distance from and opposite to the optical filter, that is optically coupled to a second end face of a waveguide opposite to the optical fiber and to the joining portion on the light-receiving surface of the optical filter.

5. An optical communication module, according to claim 4, wherein the optical filter has a predetermined optical transmission coefficient that determines an intensity of the transmitted optical signals received by the light-receiving device for monitoring outputted light power.

6. An optical communication module, according to claim 4, further comprising:
    a carrier that carries the light-receiving device for receiving optical signals and the light-receiving device for monitoring outputted light power, which is located at a distance from and opposite to the optical filter and is mounted within a module package.

7. An optical communication module, according to claim 4, wherein the light-receiving device for receiving optical signals and the light-receiving device for monitoring outputted light power are located at a predetermined distance from one another on a side surface of the carrier.

8. An optical communication module, according to claim 4, wherein the light-receiving device for receiving optical signals and the light-receiving device for monitoring outputted light power are adjacent to one another on a side surface of the carrier.

9. A method for transmitting and receiving optical signals, comprising:
    disposing a pair of waveguides in an optical communication substrate, so that a first end face of each waveguide is opposite a joining portion on a light-receiving surface of an optical filter, which is mounted on a side surface of the optical communication substrate;
    transmitting optical signals from a light-emitting device to the joining portion on the light-receiving surface of the optical filter by a waveguide and then to an optical fiber by another waveguide and to a light-receiving device for monitoring outputted light power that is located at a distance from and opposite to the optical filter; and
    receiving optical signals at a light-receiving device for receiving optical signals from the optical fiber by a waveguide to the joining portion on the light-receiving surface of the optical filter and then to the light-receiving device for receiving signals that is located at a distance from and opposite to the optical filter.

10. A method of transmitting and receiving optical signals as claimed in claim 9, further comprising:

selecting the optical filter with a predetermined optical transmission coefficient that determines an intensity of the optical signals received by the light-receiving device for monitoring outputted light power.

11. An optical communication module used for transmitting optical signals, comprising:

an optical communication substrate having a pair of waveguides;

a surface of an optical filter, mounted on a side surface of the optical communication substrate, that is optically coupled to each waveguide and to a directional coupler;

a directional coupler that is coupled to a portion of the pair of waveguides and optically coupled to a light-receiving device for monitoring outputted light power, which is located at a distance from and opposite to the optical filter, via the surface of the optical filter; and a light-emitting device for optical communication that is optically coupled to an optical fiber by the pair of waveguides and the surface of the optical filter.

* * * * *